United States Patent [19]
Bobry

[11] Patent Number: 5,994,793
[45] Date of Patent: Nov. 30, 1999

[54] UNINTERRUPTIBLE POWER SUPPLY WITH PLURALITY OF INVERTERS

[75] Inventor: Howard H. Bobry, Edmonds, Wash.

[73] Assignee: Multipower, Inc., Elyria, Ohio

[21] Appl. No.: 09/075,739

[22] Filed: May 11, 1998

[51] Int. Cl.[6] .................................................. H02J 7/00
[52] U.S. Cl. .............................. 307/64; 307/65; 307/66; 363/71
[58] Field of Search ........................... 307/64–66, 69–72, 307/77, 80, 81, 85, 86, 87, 23, 29, 45, 46, 58, 82, 151; 363/34, 37, 65, 71, 74

[56] References Cited

U.S. PATENT DOCUMENTS

| | | | |
|---|---|---|---|
| 4,709,318 | 11/1987 | Gephart et al. | 307/66 |
| 5,010,469 | 4/1991 | Bobry | 307/66 |
| 5,017,800 | 5/1991 | Divan | 307/66 |
| 5,440,179 | 8/1995 | Severinsky | 307/66 |
| 5,579,197 | 11/1996 | Mengelt et al. | 307/66 |
| 5,610,451 | 3/1997 | Symonds | 307/66 |
| 5,642,002 | 6/1997 | Mekanik et al. | 307/64 |

*Primary Examiner*—Albert W. Paladini
*Assistant Examiner*—Peter Zura

[57] ABSTRACT

A uninterruptible power system in which separate inverters are connected to separate d.c. power sources established by independent power supplies, a.c., d.c. or both, and have their a.c. outputs connected to separate transformer primary windings with the primary to secondary turns ratios of the primary windings establishing different effective secondary voltages for determining the power source for normally supplying the power from the system and the sequence in which the other power sources are used on power failure, the magnitudes of the effective voltages determining the power source for initially supplying the power with any other power source supplying the power when its effective voltage is higher than any other available power source.

26 Claims, 3 Drawing Sheets

UNINTERRUPTIBLE POWER SUPPLY WITH PLURALITY OF INVERTERS

The present invention relates to an uninterruptible power supply and especially to an uninterruptible power supply (UPS) for use in communication systems or networks, particularly wide bandwidth systems and networks, such as cable TV and telecommunications distribution systems, and to other applications in which the power sources of the UPS utilize an inverter for providing power to moderate and low power loads, i.e. under about 5 kva, although being applicable to uninterruptible power supplies generally.

BACKGROUND OF THE INVENTION

Back up power systems are available which are based on several different topologies. While many of these are sometimes referred to as uninterruptible power systems, strictly speaking they are not. In these so called UPS systems, power from a first source, most typically an a.c. power line, powers the load either directly or through a conditioning or regulating device such as a ferroresonant transformer. Upon failure of the first source, a second source, typically an inverter powered by batteries, is actively switched into the circuit to supply the load. Sometimes the first and second sources share a single ferroresonant transformer so that the load is always powered by the ferroresonant transformer, which in turn is powered by either the first source or, upon failure of the first source, the second power source which is switched in to power the transformer. Two factors conspire to prevent such designs from providing truly uninterruptible power. First, it is necessary to monitor the first power source continuously, and quickly determine that it has failed. Given the inherent time variant nature of the sinusoidal wave form typical of a.c. power sources, this is very difficult to achieve. Further, once it has been determined that the first power source has failed, it is necessary to switch over to the second power source and to positively disconnect the first source to assure that power is not fed back to the first source from the second. Typically, this switch over and disconnect process is accomplished using an electromechanical relay or contactor, which is inherently a slow device. Allowing for the time required to first detect failure of the first power source and then accomplish the change over to the second source, the output power may be interrupted for several tens of milliseconds. This is acceptable for some loads, but not others.

For sensitive loads, a full time inverter, i.e., a true UPS, is best. In this known topology, a single inverter converts d.c. power to a.c. power and supplies it to the load on a continuous basis. Generally, power is normally supplied from a first a.c. power supply, normally a power line, through a rectifier to provide a first d.c. source which normally supplies the d.c. power required by the inverter. This same rectifier keeps charged batteries which provide a second d.c. source of power. The second d.c. source is connected to the inverter in parallel with the first d.c. source. Upon failure of the first d.c. source, the inverter continues to be supplied with d.c. power from the batteries. Upon restoration of the first d.c. source, the rectifier once again powers the inverter and, at the same time, recharges the batteries. Because of the parallel connection of the first source and the battery across the input to the inverter, the inverter always supplies a.c. power to the load with no disturbance or interruption of the a.c. output when the first source fails or is restored.

The advantages of a true UPS include a continuously uninterrupted power output to the load, as well as an output whose frequency and wave form are independent of the input. This allows the UPS to serve as a frequency converter, for example, providing stable and accurate 60 Hz power from a 50 Hz power source, or from a power source having an unstable frequency such as an emergency generator. An additional advantage is that no switch is required to disconnect the input of the UPS from an a.c. source, since the inverter for inverting rectified power from the a.c. source will not feed power from other power supplies back through the rectifier.

This true UPS topology, using a dual conversion approach with the a.c. power being converted to d.c. power, and then back to a.c. power, is widely used in medium and large UPS systems, or those with output ratings above 20 kva or so, as well as small systems used in critical applications such as telecommunications.

The main disadvantage of this true UPS approach at lower power ratings has been poor efficiency. The reason for the poor efficiency of the true UPS in smaller sizes is the use of batteries, or other power sources, with relatively low d.c. voltages. Efficiency at low d.c. voltage is poor, not only because of ohmic conduction losses, but also because of losses in the semiconductor switching devices of the rectifier and inverter which have a relatively constant on-state voltage drop. A typical 1.0 volt drop across a conducting transistor, for example, is an insignificant 0.25% loss in a 400 volt apparatus, but represents a loss of nearly 4.2% in a 24 volt system.

The d.c. voltage utilized in a UPS is typically dictated by the cost of the batteries. For a given level of stored energy, a string of relatively few large cells is of significantly lower cost than a string of relatively many small cells. At the power levels typical of a small, single phase UPS in the 1 kva range, for example, batteries are most economical in the 24 to 36 volt range, but significantly higher efficiency would be achieved at a d.c. voltage in the 400 volt range.

U.S. Pat. No. 5,010,469 issued on Apr. 23, 1991 to Howard H. Bobry (the inventor herein) discusses the advantages and the disadvantages of a "true UPS". The patent discloses a UPS in which the load is normally supplied with power from an a.c. power line, with a battery supplying power upon failure of line power. The power line is connected through an isolation transformer to a rectifier which provides a relatively high voltage d.c. power source. This d.c. power source is connected to a single primary winding of a transformer through inverter circuitry having one input connected to the relatively high voltage d.c. power source and another input of the inverter circuitry connected to a low voltage d.c. power source, such as a battery, to effect a connection of the low voltage source through the inverter circuitry to a common portion of the transformer winding which is common to both d.c. sources. Operation of the inverter circuitry at the higher one of the two diverse input voltages is achieved through the use of taps on the single primary winding of the transformer and is such that the inverter circuitry operates to energize the primary winding from the relatively high voltage d.c. source as long as it maintains a higher voltage than that of the low voltage power source across the common part of the primary winding. Upon a failure of the high voltage source to maintain this higher voltage across the common portion of the primary winding, the low power source will supply the power to the primary winding until the high voltage power source again establishes a higher voltage across the common part of the primary winding While the UPS of this prior patent achieves operation at two different voltages to provide an increase in efficiency, the isolation transformer, for the power supply input to the high voltage rectifier, adds to the size, weight, and cost of the system and reduces overall efficiency of the system. This isolation is needed because of the shared inverter circuitry and a common transformer primary winding. Thus an isolation transformer for the high voltage power source is required.

In addition, the change over voltage at which the UPS supplies power from a lower order voltage source is dictated by the voltage of the lower voltage power source so that a lower voltage source cannot be given preference over a higher voltage source for supplying power to the load. Moreover the UPS of the patent is not amenable to having any additional d.c. power source connected to the common inverter and common transformer winding.

Among the various objects of the present invention, which will be apparent from the description of preferred embodiments, is the provision of a true UPS topology which: (1) enables the use of one or more a.c. power supplies, including one or more high voltage a.c. power supplies, for establishing one or more high voltage d.c. power sources for the UPS; (2) enables the order of preference (priority) for d.c. power sources of the UPS to be in accordance with or different from the order of the voltage levels of the d.c. sources and in accordance with the magnitude of an effective voltage established for each d.c. power source; (3) enables the establishment of an order of preference for the d.c. power sources which have substantially the same voltage level; (4) enables an order of preference for the d.c. power sources to be established by effective voltages for the d.c. power sources which approximate a desired output voltage from the UPS; (5) enables the setting of the effective voltages to a voltage higher than a desired output voltage with the output voltages being regulated to the desired output voltage; (6) enables the easy addition of one or more power supplies to a UPS; (7) enables the maximizing of efficiency of the transistors and the inverters of the UPS as well as cost reduction in providing isolation for the power supplies from each other and the output of the UPS to thus maximize overall system efficiency while reducing costs.

SUMMARY OF THE INVENTION

The present invention provides a true uninterruptible power supply for supplying power to a load from any one of a plurality of independent d.c. power sources in a predetermined sequence. The independent power supplies may comprise one or more d.c. sources which are established by a battery or a battery bank, and one or more d.c. sources which are established by rectifying a.c. power from a.c. power lines or from other a.c. power supplies.

The power sources are separately connected to the inputs of the separate inverters, one for each power source. The outputs of the inverters are separately connected to a voltage converting means for converting the voltages of the inverter outputs to selected different predetermined effective a.c. voltages which determine the sequence in which the power sources are to supply power to the load, with the operating effective voltage which is higher than any other establishing a back biasing voltage for each power source which produces a lesser converted effective voltage whereby the power source and its inverter providing the higher than any other effective voltage supplies power for the load.

In the preferred embodiments of the invention, the output of each d.c. power source of the UPS is directly connected to a corresponding inverter, which is separate from any other inverter, and the outputs of the inverters are each connected to energize a voltage converter having separate transformer primary windings, one for each inverter, to provide a separate transformed secondary effective voltage for each inverter and its corresponding power source. The effective voltages have different predetermined magnitudes which may approximate the desired voltage for the load with the magnitudes of the effective voltages determining the order in which the d.c. power supplies are used to supply power to the load, the preferred source for normally supplying the power having an effective voltage which is higher than any other effective voltage.

In the preferred embodiments, the transformer primary windings for the inverter outputs have a common secondary configuration. The common secondary configuration may comprise, for example, a separate secondary winding for each of the primary windings with the secondary windings being connected in parallel with each other so that the secondary effective voltage higher than any other is established as the secondary voltage for all secondary windings.

Instead of separate secondary windings for each primary winding which are connected to provide a common secondary, the primary windings for the outputs of the inverters may have a common core with a single secondary for all primaries. Any other equivalent secondary or transformer structure to that described may be utilized.

In accordance with the preferred embodiments, the desired magnitudes for effective voltages for the respective power sources are obtained by setting the primary to secondary turn ratios to provide effective voltages having relative magnitudes which establish the desired order in which the power sources are to be used to supply power to the load. The magnitude of the effective secondary voltage of each power source being such that, when a power source is supplying the load power, its secondary effective voltage establishes a primary voltage on the primary windings of the other power sources which is sufficient to back bias any power source with a lesser effective voltage against supplying load power to its corresponding inverter. When the back-biasing voltage on the primary winding for any power source drops to or slightly below the voltage output of the power source to the inverter for the winding, that power source will supply power to the load until it is again back biased by the operation of a higher order power source.

To provide the desired secondary effective voltages, the primary to secondary turns ratios for the transforming of the outputs of the inverters are set to establish secondary effective voltages with relative magnitudes corresponding to the desired order in which the d.c. sources are to be used to supply power to the load. The predetermined magnitudes for the effective voltages are also such that each is sufficient to establish the back biasing of any power source having a lesser effective voltage. When the secondary voltage of the preferred source drops to or slightly below the effective voltage of the next preferred d.c. power source, the next preferred power source will no longer be back biased and will start supplying the UPS power for the load.

In operation, all inverters of the UPS operate simultaneously. The effective voltages of the power sources preferably approximate each other to enable a following source to quickly assume the function of supplying the load when the preceding power source is failing.

The independent inverters, one for each power source, are synchronized and operate continuously and in parallel with each other.

In the illustrated embodiments of the invention, one uses two or more transformers, one for each of the inverters.

Another embodiment has a single transformer incorporating two or more primary windings, one for each of the inverters.

These and other aspects and advantages of the present invention will be readily understood and appreciated by those skilled in the art from the following description of the preferred embodiments for practicing the invention in view of the accompanying drawings.

DESCRIPTION OF PREFERRED EMBODIMENTS

The preferred embodiments of the invention for an uninterrupted power supply, are described and illustrated using certain inverter designs for the preferred modes of operation. Those skilled in the art will fully understand from the structure and operation of the preferred embodiments disclosed and described, and will appreciate, that the present invention can be practiced using many different inverter designs which convert d.c. power to a.c. power. Such inverter designs include the H-bridge inverter as illustrated herein, as well as center tapped, parallel, half-bridge, and other inverter designs as are known in the art or may be later developed. Similarly, while the use of field effect transistors (FETs) is shown, for simplification of the drawings, other switching devices such as bipolar transistors, insulated gate bipolar transistors (IGBT S), or any other device having appropriate characteristics for the intended application may be used.

Figure 1:
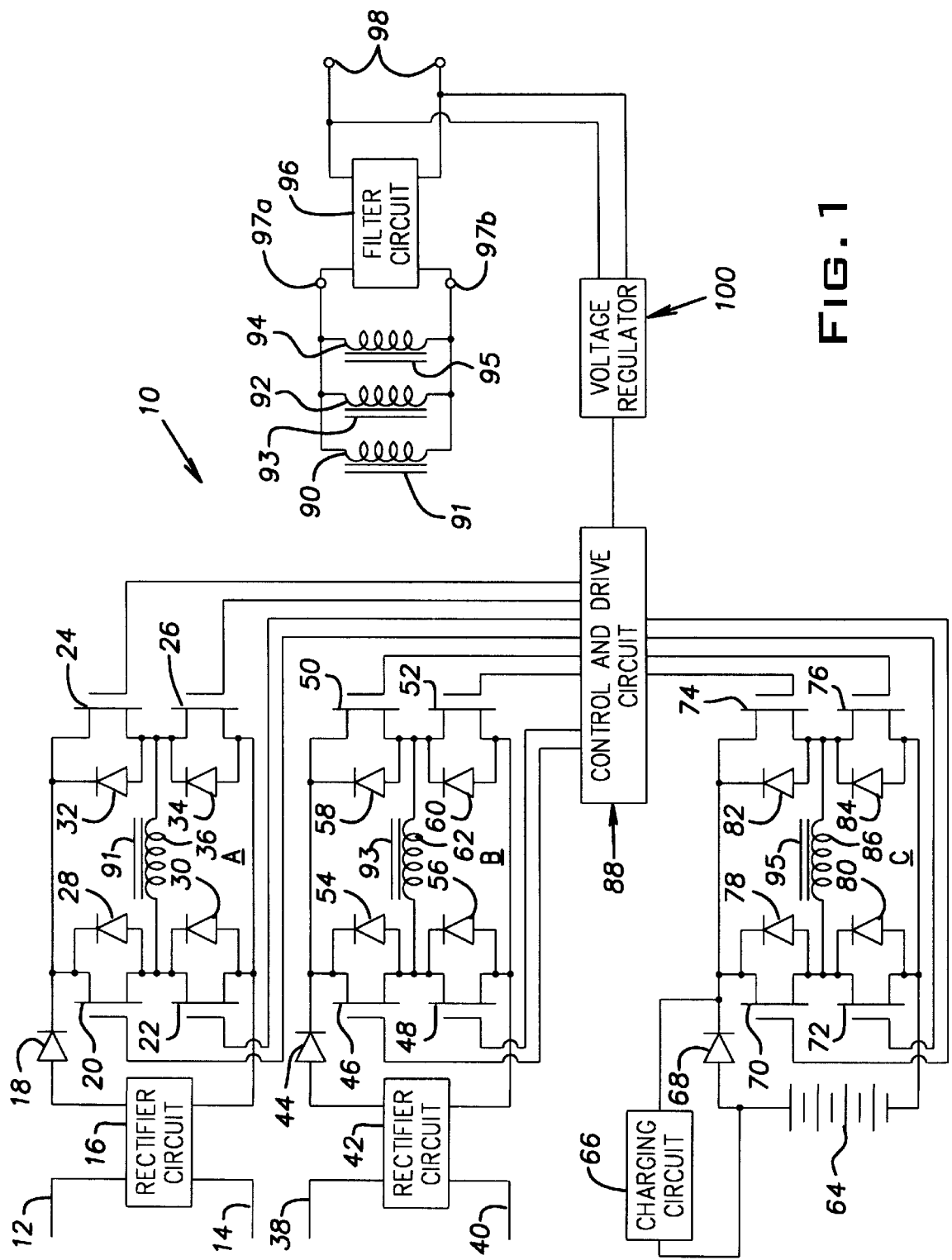
FIG. 1 is a schematic diagram on an uninterruptible power supply according to one embodiment of the invention.

In the embodiment of FIG. 1, a UPS apparatus 10 is shown as having two independent a.c. power supplies. Power lines 12, 14 from a first a.c. power supply provide power input to a rectifier circuit 16 to provide a first d.c. power source. The rectifier 16, may be a conventional rectifier circuit such as a switchmode power supply, a phase controlled rectifier, a controlled ferroresonant rectifier, a power factor controlled boost circuit, or any other suitable rectifier known in the art. The rectifier need not incorporate isolation means, as isolation of the power supplies from each other and the output will be provided by the UPS apparatus of the invention as will be appreciated from the further description of the preferred embodiments.

The d.c. output current of rectifier 16 is conducted through diode 18 to the input of an inverter A comprised of transistors 20, 22, 24, and 26. Inverter A is of conventional design. In inverter A, transistors 20 and 26 are rendered conductive to provide one half cycle of an a.c. output of the inverter and transistors 22, 24 are rendered conductive to provide the alternate half cycle. The purpose of diode 18 is to prevent a backwards, or reverse, flow of current from the inverter to the rectifier, and may not be necessary with some rectifier designs. Where diode 18 is not required, it may simply be omitted. Diodes 28, 30, 32, and 34 provide paths for reverse current flow through the inverter, thus allowing operation in all four quadrants so that the inverter may power reactive loads, as is well known and understood. These diodes may be separate and discrete components, or may be integrated with transistors 20, 22, 24, and 26.

The inverter A drives a transformer primary 36, which has an associated transformer secondary 90. The primary 36 and the transformer secondary 90, while shown spaced in the schematic, as is conventionally done, have a common transformer core 91, the core being schematically shown along both the primary 36 and the secondary 90.

A second a.c. power supply comprises a.c. power lines 38, 40. In a manner similar to that described for the first power source, the power lines 38, 40 are connected to the input of a rectifier circuit 42 to provide a second d.c. power source. The output of the rectifier circuit 42, supplies d.c. current, through (optional) diode 44, to the input of an inverter B comprised of transistors 46, 48, 50, and 52, and diodes 54, 56, 58, and 60 which operate as described for the corresponding transistors 20, 22. 24, and 26, and corresponding diodes 28, 30, 32, and 34 of inverter A.

The output of the second inverter B drives a separate primary 62 of a second transformer, the primary 62 having an associated transformer secondary 92. As before, the transformer primary winding and the transformer secondary winding have a common transformer core 93. This second transformer is separate and distinct from the previously described first transformer driven by the first inverter.

A third inverter circuit C follows the structure of the other inverters and is comprised of transistors 70, 72, 74, and 76, and diodes 78, 80, 82, and 84. The input to the third inverter circuit C is connected to the output of a third power supply comprising a battery 64. The connection from the battery to the input of the inverter circuit is shown as having a diode 68. This inverter drives a third transformer primary 86 of a separate transformer, the primary having a common core 95 with a transformer secondary winding 94.

A battery charger circuit 66 maybe be connected across the diode 68 to be powered by current flowing from the primary winding 86 through the third inverter to the battery charger when the UPS is powered by either the first or the second a.c. power source. As explained in more detail hereafter, when the UPS supplies power through either the first or second inverter, the primary winding 86 will have a secondary to primary transformed voltage thereon which will back bias power flow from the battery. This back biasing voltage will also operate through the inverter C to supply power to the battery charging circuit to keep the battery charged. This powering of the battery charging circuit is such that it does not interconnect the inverters or their power supplies, nor does it affect the isolation of the inverters and the UPS output since the back biasing voltage is established on the primary 86 by transforming the output voltage of the secondary as will be well understood, from the description herein and the drawings, by those in the art. As an alternate, a separate battery charger operating independently of the inverter circuits may be provided (not shown).

All three inverter circuits are driven in synchronization with each other by a control and drive circuit 88 in a manner well known in the art so that each inverter produces the identical wave form as the other two inverters, differing only in magnitude. The inverter wave forms may be a simple square wave, or may be a pulse width modulated wave form which is controlled to provide a regulated output voltage and/or a desired output wave shape. A filter circuit 96 may be used to further control the shape of the output wave form produced at output terminals 98. The filter circuit may be a simple LC circuit comprised of a series inductor and a parallel capacitor, or may be a more complex circuit as required by the specific application. For some applications, the filter circuit may be omitted.

The control and drive circuit 88 may be isolated from the inverters and the UPS output via the use of isolation trnasformers, optical couplers, or other suitable means well known in the art. Similarly, isolating means may be used to supply power to the control and drive circuit 88 from each of the power supplies for the UPS. As is conventional practice, connections (not shown) are made to the power lines 12, 14, and 38, 40 for the rectifiers 16 and 42 and to the battery 64 to establish individual d.c. sources (not shown) for powering the control and drive circuit. The outputs of these d.c. sources are ORed in a well known manner to supply power to the control and drive circuit whenever one or more of the power supplies for the UPS are available, i.e., are functional to supply power.

While inverters A, B, C, have been described as having the same design, and operating in the same manner, it will be understood that the present invention allows the transistors and the inverter designs for the inverters to be different to maximize the efficiency of the respective inverters at the applied voltage.

In accordance with the present invention, the secondary transformed voltages constitute effective voltages for the d.c. power sources and the transformation ratios for the primaries are such as to provide secondary effective voltages of magnitudes which are different from each other and which approximate the desired output voltage for the UPS. The relative magnitudes of the effective voltages will determine the order of preference in which the respective d.c. power sources operate to supply load power from the UPS. The most preferred d.c. source, i.e. the one chosen for normally supplying power from the UPS, has a transformed voltage higher than that of any other and which operates to reverse bias all other d.c. sources, with each other d.c. power source assuming the function of supplying power to the load through the UPS when its effective voltage becomes higher than any other and it will continue to supply power for the load until a d.c. power source of higher order reestablishes a higher effective voltage.

As noted above, the UPS output will, at any time, normally be powered by the preferred inverter, when it is available, because it is the one having an effective voltage higher that any other d.c. power source. This effective voltage will cause all other primaries to reverse bias their power sources, whether rectifiers or batteries, or any other type of d.c. source, and prevent the power sources from supplying current to their respective inverters. If the preferred power source fails, another inverter and its power source becomes the most preferred and automatically and naturally, without any action by a control circuit, provides the power for the load. This operation is similar to the use of diodes to "OR" d.c. power sources together to supply power to an inverter so that the power source having the highest voltage will supply power to the load but upon failure of that voltage source the voltage source having the next highest voltage will assume the load. By using an inverter for each power supply and effectively OR-ing together the transformer outputs for the inverters, the power supplies or sources for the inverters may be isolated from each other as well as from the a.c. output of the UPS to allow, for example, the use of low voltage batteries as one power source which are safely isolated from a high voltage power line used as another voltage supply. As will be understood by those skilled in the art from the foregoing, this isolation may be accomplished since each primary winding is dedicated to one d.c. power source and the inverter for that power source and there need not be any connections between inverters. In addition, the rectifiers will block any feed back from the primary windings when a primary is back biasing its corresponding d.c. source.

As noted, adjustment of transforming ratios allows any desired order of preference for the power sources to be set by design, even to render as the most preferred power source, one which has a lower voltage than a lesser preferred power source. For example, a most preferred power source may be from a first a.c. power line which is of lower voltage than a second a.c. power line of higher voltage but which is preferred only as an alternate to AC first power line.

It will also be understood that the voltage of a d.c. power source may be changed, for example, by boosting the voltage when rectifying a.c. power, to change the secondary effective voltage for the d.c. power source. This provides flexibility not only when designing a UPS in accordance with the present invention, but also facilitates later modifying the order of preference in the UPS as well as the addition of power sources, particularly when using power supplies of substantially the same voltage. An example may provide useful clarification of circuit operation. Assume that the first rectifier circuit 16 produces a regulated d.c. output of 400 volts, (the rectifier may provide d.c. power either lower or higher than the a.c. supply). Further assume that the UPS output is to be a 60 volt square wave, typical of that required for powering broad band communications networks over coaxial cable. The inverter comprised of transistors 20, 22, 24, and 26 will provide a 400 volt square wave across transformer primary 36, while a 60 volt square wave is desired across transformer secondary 90. This is accomplished by setting the primary to secondary turns ratio in accordance with the transformer equation:

$$Vp/Vs = Rps,$$

where V is voltage and subscript p indicates primary, s indicates secondary, R is turns ratio and ps indicates primary to secondary turns ratio. Accordingly the Rps for the first transformer with 400 volts on the primary, and a secondary voltage of 60 volts, will be 400/60, or 6.66/1.

Assume that the second rectifier circuit 42 produces a regulated d.c. output of 360 volts. The turns ratio between the second transformer primary 62 and the second transformer secondary 92 should be 360/60, or 6.00/1. Similarly, given the nominal voltage of the battery 64 as 36 volts, the turns ratio between the third transformer primary 86 and the third transformer secondary 94 should be 36/60, or 0.60/1 so that a 60 volt output can be supplied from the 36 volt battery.

It will be recognized that all three transformer secondaries, 90, 92, and 94 are connected in parallel across the secondary output connections 97a, 97b, and thus all have the same voltage, i.e. the secondary effective voltage which is higher than any other. With the first a.c. power supply available, the first rectifier circuit 16 provides a 400 volt d.c. source for the first inverter, which in turn produces a 400 volt a.c. square wave across transformer primary 36, resulting in a 60 volt a.c. square wave across all three transformer secondaries. With a secondary voltage of 60 volts across the secondary winding of the second transformer, the voltage across the primary 36 of the second transformer, as given by the above equation, will be 60×Rps or 360 volts, the assigned primary to secondary turns ratio having been 6.00/1, Thus, with the assigned turns ratio the voltage will be the same voltage as its d.c. source, i.e. the rectifier circuit 42. A slight difference in voltage at either the first rectifier circuit 16 or the second rectifier circuit 42 would determine which of the two sources would supply the load, but it is preferred that the first power source supply power for the load when it is available. This can be assured by adjusting the turns ratio of our second transformer slightly. By making the turns ratio 6.10/1, rather than 6.00/1, the secondary voltage for 360 volts on the primary 62 will be 360/6.10, or 59 volts. This is lower than the 60 volts of the first transformer but when the first power source supplies the power, the secondary voltage of 60 volts of the first transformer, is now transformed by the second transformer with a secondary to primary turns ratio of 1/6.1, and the above equation now becomes Vp=60×6.1, and a voltage of 366 volts is established across the primary for the second power source. This exceeds the 360 volt level of the output of the second rectifier circuit 42, so no current will flow from this second rectifier circuit. All of the power required will be supplied by the first power source, as desired. If the first power source fails, power will then flow from the second power source, via second rectifier circuit 42. With the primary/secondary turns ratio of the second transformer now at 6.10/1, the secondary effective voltage of the second power source will be 360/6.10, or 59 volts and the second power source will operate to supply power for the load when the voltage on its secondary is 59 volts. This does not provide the 60 volts desired for the load, but we will discuss this in more detail later.

Similarly, the 60 volt level from the first transformer, when it is available, will be across the third transformer secondary 94. With the assumed battery voltage of 36 volts and an assigned primary to secondary ratio of 0.60/1, 60 volts on the secondary of the third transformer would transform to 36 volts across the primary winding for the battery, which is again the same as the assumed nominal voltage of the d.c. power source, i.e. the battery. This again needs to be adjusted slightly to prevent power flow from the battery at 36 volts as was done for the second power source. By making the primary to secondary turns ratio 0.62/1, the secondary voltage from the battery will be 58 volts. With this primary/secondary turns ratio, when the secondary for the battery transformer has 60 volts across it from the first transformer, the voltage across the third transformer primary 86 will be transformed with a transformation factor of 0.62 to provide 37.2 volts across its primary. When the voltage across the secondaries is from the second power source, 59 volts, the voltage on the primary for the battery will be 36.6 volts. Either voltage would block current flow from the battery to its primary winding.

Thus far the circuit of FIG. 1 provides an output voltage which will vary from 58 volts (battery) to 60 volts (first source), depending upon the power sources. This is satisfactory for many applications. However, some applications need a better regulated output voltage including those which require adjustments for the nominal 36 volt battery which thus far has been assumed to be operating at 36 volts. This battery will not operate at a constant 36 volts. Battery voltage will, in fact, typically vary from about 42 volts at full charge to about 32 volts when fully discharged. A feature of the present invention, is that the turns ratios may be further adjusted so that the third transformer will have no power flow from the battery when its voltage is as high as 42 volts, and the voltage across transformer secondaries 90, 92, and 94 is as low as 59 volts.

This adjustment results in a turns ratio for the third transformer of 0.72/1. With this turns ratio, operation from a fully charged battery at 42 volts would result in a secondary voltage of 58.3 volts. However, when operating from a discharged battery at 32 volts this would result in a secondary voltage of 44.4 volts. The output voltage of the UPS could thus vary from 60 volts to 44.4, depending on which power source is being used and the state of the battery.

A regulated output, constant regardless of the power source or state of charge of the battery, may be provided through a voltage regulator. The UPS of FIG. 1 utilizes a voltage regulator 100 which utilizes pulse width modulation. Using pulse width modulation in a well known manner, the voltage regulator circuit 100 monitors the output voltage of the UPS and controls the duty cycle of the inverters to maintain a constant and well regulated output voltage.

Figure 2:
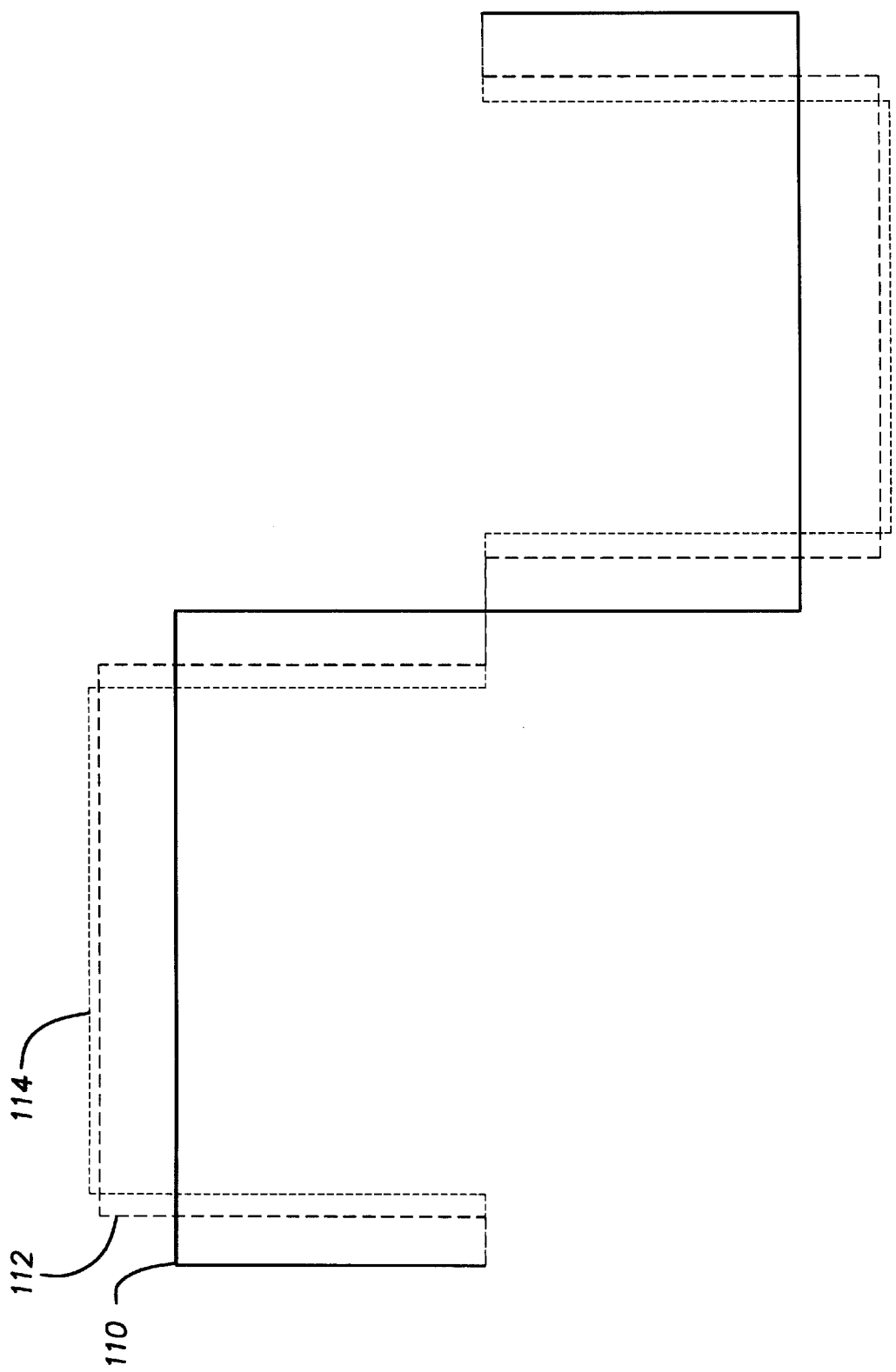
FIG. 2 illustrates a pulse width modulated inverter wave form.

FIG. 2 illustrates the inverter voltage wave forms resulting from the use of pulse width modulation. As is conventional, each half cycle of the wave form may be comprised of a single pulse, either positive or negative on alternating half cycles with the instantaneous voltage of the inverter being controlled by changing the width of the pulse whereby the instantaneous voltage during each half cycle of the inverter is either positive or negative, or zero as shown in FIG. 2.

With reference to FIG. 2, a voltage wave form 110 as shown would appear across transformer secondaries 90, 92, and 94 when the UPS is operating from battery 64 at its low voltage, such as 32 volts in the given example. Wave form 112 of FIG. 2 is a typical voltage wave form which would appear across the transformer secondaries when the UPS is operating from the second power source, and wave form 114 is a typical voltage wave form which would appear across the transformer secondaries when the UPS is operating from the first power source. While the three voltage wave forms shown in FIG. 2 differ in shape, voltage regulator circuit 100 is used to adjust pulse width so as to maintain a constant voltage output at terminals 98. Such regulator circuits are well known and no further description is necessary to those working in the art. Filter circuit 96 will function to assure that the output voltage wave form approximates a square wave, or a sinusoidal wave form, or such other wave form as may be desired in a specific application. It will be understood by those versed in the art that the desired regulation by pulse width modulation may also be achieved by varying the widths of multiple pulses per half cycle, as is well known.

Returning to our example, the turns ratio for the battery 64 based on a fully charged battery was adjusted to 0.72/1 to have no power flow from a fully charged battery voltage of 42 volts. However, with the ratio of 0.72/1, the battery 64 at its minimum voltage of 32 volts, and the wave form 110 of maximum pulse width, as shown in FIG. 2, the UPS output voltage will be 44.4 volts. The output voltage when operating from either the first or second power source could be regulated down to that same 44.4 volt figure by the use of pulse width modulation of FIG. 2. But this would provide a regulated 44.4 volt UPS output when a 60 volt output is specified. This can be achieved by making a further adjustment to the transformer turns ratios to boost the UPS output voltage to 60 volts. To do this, all of the turns ratios are adjusted by dividing them by a factor of 60/44.4, i.e. 1.35. This factor is the desired output voltage for the UPS (60 volts) divided by the effective voltage of 44.4 for the battery when operating at a low charge (32 volts) with a transformer primary/secondary turns ratio of 0.72/1), which is the turns ratio set for the battery at full charge (42 volts). Dividing all the turns ratio by 1.35, the turns ratio of 6.66/1 for the first transformer is now 4.93/1; the ratio 6.10/1 for the second transformer is now 4.52/1 and the third transformer ratio 0.72/1 is now 0.53/1. This sets the primary turns ratios for all power supplies lower to provide higher than the 60, 59, and 58 volts for the secondary voltages of the first and second sources, and the battery when operating at 42 volts, the effective voltage for a battery operating at 32 volts being slightly above the desired 60 volts for the secondary voltage.

The secondary voltages for the transformers will now be about 81.1 for the first transformer, about 79.7 for the second transformer, and about 79.3 for the third transformer with the battery operating at 42 volts and about 60.4 volts when the battery is operating at 32 volts.

It will be noted that the effective secondary voltage for the second transformer is more than one volt lower than that of the first transformer and only 0.3 volt higher than that of the battery effective voltage when at 42 volts. Depending on the voltage regulation of the first and second d.c. power sources it may be advantageous to use a 4.5/1 turns ratio for the primary of the second transformer for the second power source to provide an effective voltage of 80 volts which is about 1.1 volts below that for the first power source and about 0.7 volt higher than that for the battery source when operating at 42 volts.

These effective voltages, all of which exceed the desired 60 volts for the UPS, are, by using voltage regulation as described, regulated down to the desired 60 volts to maintain the desired output voltage for the UPS for all power sources. The order of the magnitudes for the effective voltages of the power sources are maintained so that the order of preference for supplying power from the UPS apparatus is also maintained. It will be noted that for the voltage regulation described, the power source which is the less preferred of all power sources is assigned an effective voltage which is less than any other effective voltage and the primary/secondary turns ratios are set so that the power source which is preferred less than any other has an effective secondary voltage which is a little higher than the desired load voltage, with all effective voltages higher than the desired load voltage being regulated down to the desired voltage.

Figure 3:
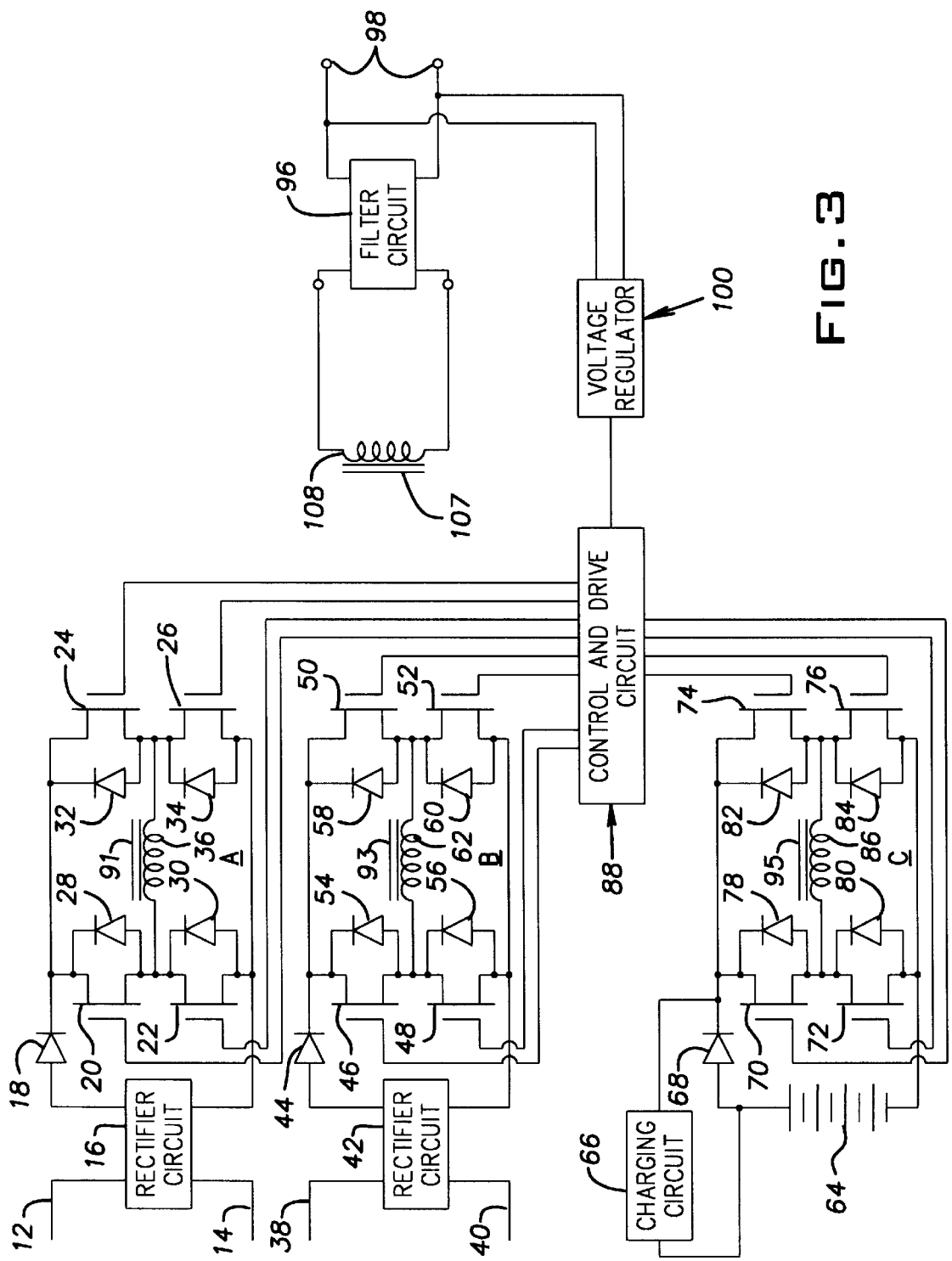
FIG. 3 is a schematic diagram of an uninterruptible power supply according to another embodiment of the invention.

FIG. 3, illustrates a modification of the UPS of FIG. 1 and is a preferred embodiment of the present invention. The embodiment utilizes the same power supplies, rectifiers inverters and diodes of the embodiment of FIG. 1. These function as in FIG. 1 to energize an individual primary for each inverter. Accordingly, the circuitry has been given the same reference as in FIG. 1. However, the three transformer primaries 36, 62, and 86 shown in FIG. 1 are replaced with three transformer primaries 102, 104, and 106. Whereas the three transformer primaries of FIG. 1 are each closely coupled magnetically to an individual one of associated transformer secondaries 90, 92, and 94 respectively using three separate transformer cores, the three transformer primaries of FIG. 3 are closely coupled magnetically to each other with a single transformer core 107 having a single transformer secondary 108 constituting a common secondary for the primary windings. The secondary 108 is connected to the filter circuit 96 and thence to the output terminals 98. All components of the embodiment of FIG. 3 operate in the same manner as in FIG. 1, but have a common core 107 for the primary and secondary windings with a single secondary 108 replacing the three parallel connected secondary windings of the first embodiment, this being the full equivalent to the parallel connected secondaries as is well known by those in the art. The turns ratios for the primary windings and voltage regulation are the same in both embodiments.

The transformer secondary of the embodiment of FIG. 3 need not be closely coupled magnetically to the transformer primaries. The transformer may in fact comprise a ferroresonant transformer, or a controlled ferroresonant transformer, both well known in the art, in which case the functions of the filter circuit 96 and the voltage regulator circuit 100 are provided by the transformer, so the separate filter circuit and voltage regulator circuit may be omitted. As an alternate, the voltage regulation circuit may be retained for use with a ferroresonant transformer, thus regulating the primary voltage of the transformer and enhancing its efficiency.

Further, it is understood that a UPS according to the present invention may be operated to provide any output frequency, voltage, or wave form suitable for the intended application, and with the addition of a bridge rectifier across the output terminals 98, as is well known, a d.c. output may be obtained.

While UPS embodiments comprising three inverters have been described, it is understood that these are exemplary of the best modes, and that any number of inverters greater than one may be used. Most typically, a UPS according to the present invention would use two inverters, one operating from a first power source such as the commercial power line, and the other operating from a second power source such as a battery. It is understood that additional power sources, either a.c. or d.c., may be incorporated using a separate inverter and transformer primary for each added power source. A UPS may, for example, be comprised of a first inverter for operation from a first power source such as an a.c. power line, a second inverter for operation from a second power source such as an a.c. generator, a third inverter for operation from a third power source such as a fuel cell, a fourth inverter for operation from a fourth power source such as an array of photo voltaic cells, a fifth inverter for operation from a fifth power source such as a battery, and so on. Preferably, for efficiency, the UPS will be set to naturally and automatically select the available power source which allows operation via the inverter having the highest input voltage available, thus resulting in maximum efficiency at all times consistent with the power sources available. The apparatus can be designed such that it is of modular construction, allowing additional inverters and primary windings to be added as additional power sources are made available, and allowing inverters to be removed for maintenance or as power sources become unavailable.

The present invention thus provides a true uninterruptible power supply having a plurality of inverters for operation from a plurality of power sources, the power sources being selected naturally and automatically to operate the UPS from available power sources in a sequential predetermined order of preference which may differ from the sequential order of the voltage magnitudes of the power sources, with the order of preference being typically determined so as to maximize efficiency.

It will be understood from the foregoing that the separate outputs of the inverters are connected to a common power output by circuitry which establishes an effective voltage for each inverter with the effective voltages being of different magnitudes and preferably approximating the desired voltage for the load. In the described circuitry, the output from the parallel connected secondary windings of FIG. 1 and the single secondary winding of FIG. 3 each provide a common power output for the preferred embodiment.

It is also to be understood that the effective voltages described herein are those voltages which would actually exist from an operating power source at the common output of the transformer secondary if there is no modification as by voltage regulation. However, the effective voltages can differ from the desired load voltage within the range of voltage regulation as illustrated in the example in which the turns ratios are adjusted to provide a desired effective secondary voltage for a battery at its fully charged voltage and a different desired effective voltage at its fully discharged voltage, with all effective voltages being regulated down to the desired load voltage. Moreover, the effective voltage, which is that determined by the primary to secondary turns ratio for a given voltage of the d.c. source, will vary with voltage variations of the d.c. source. Preferably, the primary to secondary turns ratios for the effective voltages are set to accommodate the normal voltage variations of the d.c sources for supplying power and to provide the described back biasing voltages for lower order power sources.

It can also be seen from the foregoing that the present invention ORs the separate simultaneously operating inverters for the separate power supplies to establish one of the inverters as the inverter for supplying power to a load. This ORing is accomplished by providing separate inverters for the power sources and connecting the outputs of the inverters to separate transformer primaries to establish different effective secondary voltages for the inverters, the secondary voltages having a common secondary for ORing the inverters so as to supply load power from one inverter, i.e., the inverter with an effective secondary voltage higher than any other inverter with an operative power supply, the other operable power supplies of lower order being back biased by the higher effective secondary voltage. It may also be seen that by using separate inverters for the power sources and separately transforming the outputs of the separate inverters, the UPS of the present invention maintains isolation between the power sources and between the power sources and the load.

Various aspects of the invention will also be appreciated from the foregoing description of preferred embodiments. Among others, it will be appreciated that the present invention enables the use of one or more a.c. power supplies in a UPS having an a.c. output, including one or more high voltage a.c. sources. Further, it enables the order of preference, or priority, for the d.c. power sources of the UPS to be different from the order of the voltage levels of the d.c. sources. It also enables an order of preference for d.c. power sources having substantially the same voltage level to be established. Moreover, it enables each d.c. power source to establish an effective secondary voltage which approximates the desired voltage for the load. And with voltage regulation, the effective voltages may be set sufficiently higher than the desired output from the secondary, as described herein, to effect voltage regulation to the desired secondary output voltage for all d.c. sources. It also reduces the cost of and losses in the UPS system by reducing isolation costs and loses associated there as well as enabling the inverters to be designed for the voltages of the individual power sources.

Moreover the present invention also provides an improved method of supplying continuous uninterruptible power to a load. In the method, load power is supplied from one of a plurality of independent d.c. sources which have nominal voltages and which are to be used in a predetermined order initially and on power failure. In the method of the preferred embodiments, a primary to secondary transforming ratio is established for each power source for transforming the inverted voltage from the power source to an effective secondary voltage with the primary to secondary transformation ratios for the power sources being such that the effective voltages of the power sources have different magnitudes with the magnitudes defining a sequential order corresponding to the sequential order in which the d.c. power sources are to be used to supply power to the load, and the magnitudes of the effective voltages for the power sources are such that each power source higher in the order of preference than another has an effective secondary voltage of a magnitude which will back bias the next lower order power source against supplying power, thereby establishing the operative d.c. power source having a secondary effective voltage higher than any other as the power source which supplies load power.

It will be understood that the effective secondary voltage for a power source and its inverter and primary is the secondary voltage which would be produced using primary to secondary turns ratios as described. If there is no voltage regulation, the secondary output voltage is the effective secondary voltage for each power source when it is supplying the power.

As will be understood by those in the art, when pulse width modulated voltage regulation as described is used to regulate the secondary output of the transformers to a desired load voltage, the regulated secondary voltages contain instantaneous voltages of the magnitude of the effective voltages so that the instantaneous voltages of the effective voltage higher than any other will establish the back biasing of the lower order power sources. Other known voltage regulators equivalent to that described may also be used.

As generally used, high voltage power sources are generally power sources having a voltage of at least about 170 volts, but normally 200 volts or over, with a low voltage source having a voltage of up to about 70 volts and a moderate voltage source being between the high and low voltage sources.

While the invention has been shown and described with respect to specific embodiments thereof, it has been for the purpose of illustration rather than limitation, and other variations and modifications of the specific embodiments herein shown and described will be apparent to those skilled in the art and within the scope of the invention claimed.

What I claim:

1. An uninterruptible power supply for supplying electrical power from any one of separate d.c. power sources, said uninterruptible power supply comprising:

a plurality of separate inverters having separate inputs for connecting each inverter to the output of a corresponding one of the d.c. power sources, each of said inverters having a separate a.c. output, and transforming means for establishing transformed effective voltages of different magnitudes from the a.c. outputs of said inverters, said transforming means comprising a load power output for power from said inverters and separate individual primaries each connected to the output of a different one of said inverters, said primaries having secondary means for establishing said effective voltages, said secondary means having a common secondary configuration connected to said load power output with said common secondary configuration establishing the power source for the inverter having an operative effective secondary voltage higher than any other as the power source for supplying output power from the transforming means.

2. An uninterruptible power supply as defined in claim 1 in which a first one of said inverters has its input connected to the output of an a.c. voltage rectifier comprising one of the d.c. power sources and a second of one of said inverters has its input connected to a low voltage d.c. source comprising another of said d.c. sources.

3. An uninterruptible power supply as defined in claim 1 in which a first one of said inverters has its input connected to the output of an a.c. voltage rectifier comprising one of the d.c. power sources and a second of one of said inverters has its input connected to a low voltage d.c. source comprising a battery.

4. An uninterruptible power supply as defined in claim 1 in which said primaries of said transforming means have predetermined primary to secondary turns ratios set to establish effective secondary voltages of different magnitudes to determine the order of preference in which the inverters operate to supply load power to said transforming means, the effective voltage of a first one of said inverters being set higher than any other effective voltage whereby the inverter normally supplies the load power.

5. An uninterruptible power supply as defined in claim 4, in which said inverters have control means for effecting continuous, simultaneous operation of said inverters to provide phase synchronized a.c. power from the inverters.

6. An uninterruptible power supply as defined in claim 4, which comprises voltage regulating means responsive to the output of said transforming means to regulate the portions of the half cycles of the a.c. output from each inverter during which the inverter output provides power to said transforming means.

7. An uninterruptible power supply as defined in claim 5, which comprises voltage regulating means responsive to the output of said transforming means to regulate the portions of the half cycles of the a.c. output from each inverter during which the inverter output provides power to said transforming means.

8. An uninterruptible power supply as defined in claim 1 in which said inverters comprise at least three inverters having their inputs connected to separate d.c. power sources and their outputs connected to separate ones of said primaries, and in which two d.c. sources for said inverters each comprise an a.c. rectifier having a voltage higher than a third power source for the other of said inverters, said third power source being a low voltage power supply.

9. An uninterruptible power supply as defined in claim 8 in which said third power source is a battery power supply.

10. An uninterruptible power supply as defined in claim 8, in which said inverters have control means for effecting continuous, simultaneous operation of said inverters to provide phase synchronized a.c. power from the inverters.

11. An uninterruptible power supply as defined in claim 8 in which the power supply for said third power source is a battery power supply which operates between a fully charged high battery voltage and a low discharged voltage, and in which said turns ratio for the primary to which the inverter for the battery power source is connected is set to provide power at about the desired load voltage for low battery voltage with each other turns ratio for each other primary being set to provide an effective secondary voltage above the effective secondary voltage for the battery operating at a fully charged voltage, and which further comprises voltage regulating means for regulating the secondary output voltage of said transforming means.

12. An uninterruptible power supply as defined in claim 10, which comprises voltage regulating means responsive to the output of said transforming means to regulate the portions of the half cycles of the a.c. output from each inverter during which the inverter output provides power to said transforming means.

13. An uninterruptible power supply as defined in claim 1, in which said inverters have control means for effecting continuous, simultaneous operation of said inverters to provide phase synchronized a.c. power from the inverters.

14. An uninterruptible power supply as defined in claim 13, which comprises voltage regulating means responsive to the output of said transforming means to regulate the portions of the half cycles of the a.c. output from each inverter during which the inverter output provides power to said transforming means.

15. An uninterruptible power supply as defined in claim 1, which comprises voltage regulating means responsive to the output of said transforming means to regulate the portions of the half cycles of the a.c. output from each inverter during which the inverter output provides power to said transforming means.

16. In an uninterruptible power supply as defined in claim 1 in which said primaries of said transforming means have predetermined primary to secondary turns ratios for establishing said effective voltages of different magnitudes which determine the sequence in which the d.c. power sources will operate to supply load power to said transforming means, the effective voltage of the power source for a first one of said inverters being higher than any other effective voltage and the effective voltage of the power source for a second one of said inverters being lower than any other effective voltage, said primary turns ratios being set for each primary to provide effective voltages having magnitudes such that each effective voltage higher than another effective voltage establishes a biasing voltage on each primary having a lower effective voltage to reverse bias its corresponding power source from supplying power.

17. An uninterruptible power supply as defined in claim 1 in which said transforming means comprises a ferroresonant transformer comprising said separate primaries.

18. An uninterruptible power supply as defined in claim 1 in which said transforming means comprises a controlled ferroresonant transformer comprising said separate primaries.

19. An uninterruptible power supply for supplying power from any one of a plurality of d.c. power sources at least one of which is a low voltage source and the other of which is a high voltage source, a common load power output for power from the d.c. sources, a plurality of separate inverters having separate a.c. outputs and separate inputs with each inverter input being connected to a different one of the d.c. power sources, and a voltage converter for supplying power from an inverter to the common load output, said voltage converter having a separate input connected to the output of each inverter to convert the a.c. voltages from the inverters to different a.c. voltages, said converter having circuitry connecting the available converted voltage higher than any other to said common output.

20. An uninterruptible power supply as defined in claim 19, in which said inverters have control means for effecting continuous, simultaneous operation of said inverters to provide phase synchronized a.c. power.

21. An uninterruptible power supply as defined in claim 19 in which said voltage converter comprises transforming means for separately transforming the outputs of said inverters to different effective secondary voltages, said transforming means comprising separate primaries each connected to a corresponding one of said inverters and common secondary circuitry for said primaries connected across said common output with the operating effective voltage higher than any other establishing a biasing voltage on each primary having a lower effective voltage to back bias the d.c. power source therefor from supplying power.

22. An uninterruptible power supply as defined in claim 19 in which said voltage converter comprises multiple transformers having primaries with each of said inverters being connected to a different primary, said transformers each having a secondary connected to said common load output.

23. An uninterruptible power supply as defined in claim 19 in which said voltage converter comprises a single transformer having a separate primary connected to the output of each inverter and a secondary for said primaries.

24. An uninterruptible power supply as defined in claim 23 in which said transformer is a ferroresonant transformer.

25. An uninterruptible power supply as defined in claim 23 in which said transformer comprises a controlled ferroresonant transformer.

26. A method of supplying uninterruptible electrical power to a load from any one of a plurality of independent d.c. power sources having nominal voltages and which are to be used in a desired predetermined sequence initially and on power failure, the method comprising the steps of: determining an a.c. voltage converting ratio for voltage from each power source for converting the voltage from the source to an effective voltage with the effective voltages for the power sources having different magnitudes in a sequence corresponding to the predetermined sequence for using the d.c. power sources to supply power, separately inverting the voltage of the d.c. power sources to a.c. voltages, converting the a.c. voltages to effective voltages using said ratios, using the available effective voltage higher than any other effective voltage to supply power for the load and to establish a back biasing voltage on each other power source having a lower converted effective voltage.

* * * * *